United States Patent
Kung et al.

(10) Patent No.: US 6,501,752 B1
(45) Date of Patent: Dec. 31, 2002

(54) FLEXIBLE PACKET TECHNIQUE FOR MONITORING CALLS SPANNING DIFFERENT BACKBONE NETWORKS

(75) Inventors: Fen-Chung Kung, Bridgewater, NJ (US); Jesse Eugene Russell, Piscataway, NJ (US); Anish Sankalia, Iselin, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/376,782

(22) Filed: Aug. 18, 1999

(51) Int. Cl.$^7$ ............................................... H04L 12/66
(52) U.S. Cl. .................................. 370/352; 370/395.64
(58) Field of Search ................................ 370/351, 352, 370/353, 354, 355, 356, 357, 358, 373, 385, 386, 395.52, 395.64

(56) References Cited

U.S. PATENT DOCUMENTS

| | | | |
|---|---|---|---|
| 6,115,393 A | | 9/2000 | Engel et al. |
| 6,289,025 B1 | | 9/2001 | Pang et al. |
| 6,339,594 B1 | * | 1/2002 | Civanlar et al. ............ 370/352 |
| 6,393,014 B1 | * | 5/2002 | Daly et al. .................. 370/352 |
| 6,452,922 B1 | * | 9/2002 | Ho .............................. 370/352 |
| 6,453,034 B1 | * | 9/2002 | Donovan et al. ........... 370/356 |

\* cited by examiner

*Primary Examiner*—Wellington Chin
*Assistant Examiner*—Brenda Pham

(57) ABSTRACT

A monitoring network is able to provide surveillance of IP phone calls, which span plural backbone networks, which may embody different transmission techniques. An agent connected through a monitor center to one backbone network enters a request for surveillance (i.e. wiretapping) of a particular network connected to another backbone network. A WatchDog program is associated with each backbone network. These WatchDogs all communicate with other watchdogs associated with other backbone networks. All these watchdogs interact with one another to set up the surveillance connections. The watchdog of the requester's backbone network receives the surveillance request and flows/transmits the request to a watchdog function of the terminating backbone network of the specific caller to be monitored establishing a point-to-point connection, through as many backbone networks as needed. The terminating WatchDog of the termination backbone network flows/transmits the request to a destination WatchDog associated with an IP address mapping checkpoint of the target telephone number to be surveillanced. The destination watchdog communicates with the requesting WatchDog using predefined protocols spanning the intervening backbone networks. The destination WatchDog replicates the packets of the target telephone and transmits them to the originating monitor center.

5 Claims, 2 Drawing Sheets

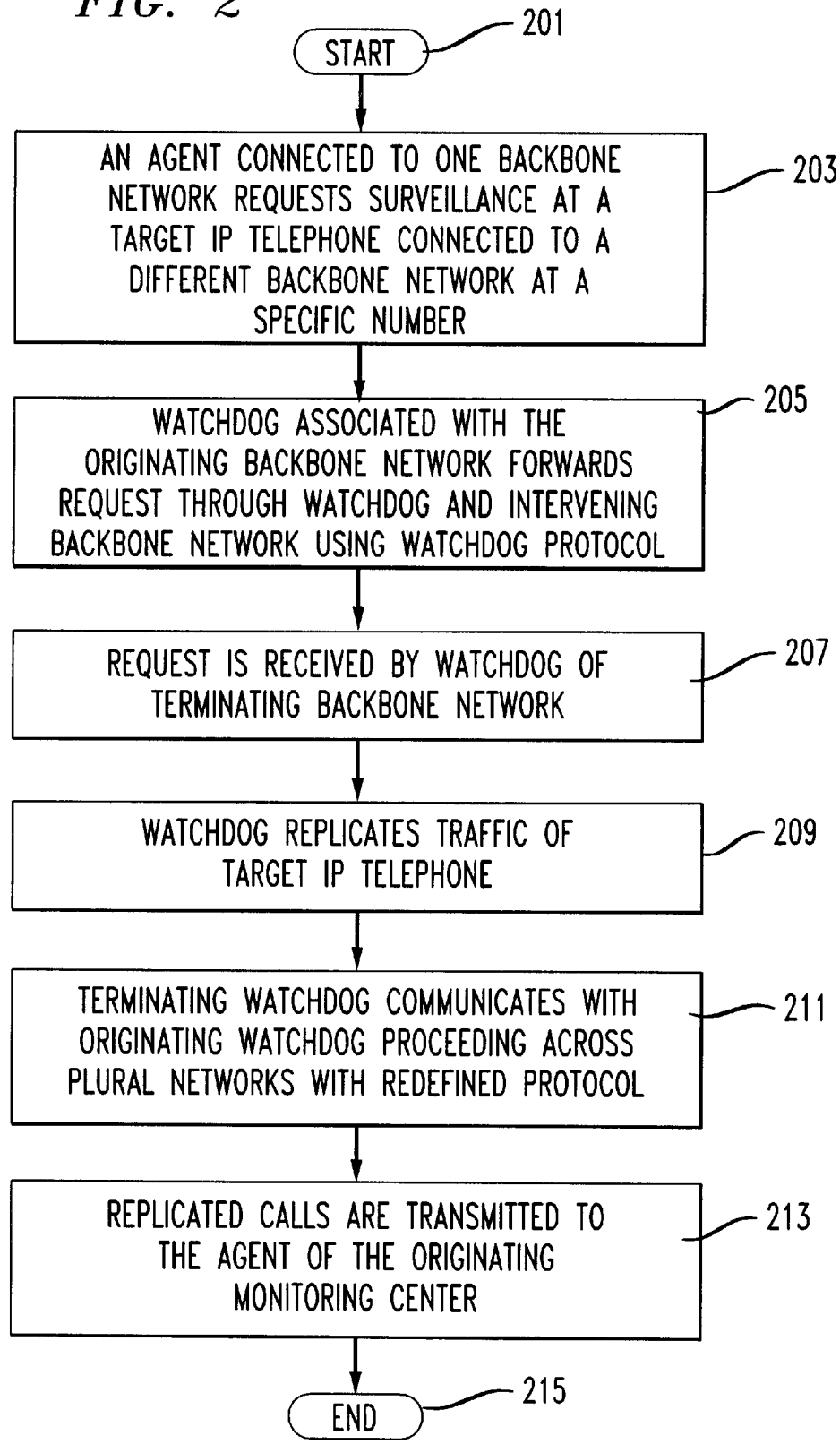

FLEXIBLE PACKET TECHNIQUE FOR MONITORING CALLS SPANNING DIFFERENT BACKBONE NETWORKS

FIELD OF THE INVENTION

This invention relates to surveillance of telephone calls over a public communications link and is particularly concerned with providing assistance for such surveillance to law enforcement agencies. It particularly concerns surveillance of voice over IP (i.e., cable) networks.

BACKGROUND OF THE INVENTION

Requirements for enabling surveillance of electronic communications have been enacted into public law (e.g., Public Law 103–414 enacted Oct. 25, 1994; CALEA Communications Assistance for Law Enforcement Act) reciting requirements for assuring law enforcement access to electronic communications. Such access is required to be in real time, have full time monitoring capabilities, simultaneous intercepts, and feature service descriptions. The requirements specifically include capacity requirements and function capability. It is incumbent upon communication carriers to provide such capability and capacity.

While initially limited in scope, at present, to certain communications technology it is almost assured that it will be extended to new emerging communication technologies such as IP telephony. These new technologies are plural and will exist side by side with other new technologies as well as traditional technologies. They will be plurally encountered along all stages of the network. It is important that surveillance techniques be able to operate in these combined pluralities of technologies.

SUMMARY OF THE INVENTION

A monitoring network, embodying the principals of the invention, is able to provide surveillance of IP phone calls, which span plural backbone networks, which may embody different transmission techniques.

An agent connected through a monitor center to one backbone network enters a request for surveillance (i.e. wiretapping) of a particular network connected to another backbone network. A WatchDog program is associated with each backbone network. These WatchDogs all communicate with other watchdogs associated with other backbone networks. All these watchdogs interact with one another to set up the surveillance connections.

The watchdog of the requester's backbone network receives the surveillance request and flows/transmits the request to a watchdog function of the terminating backbone network of the specific caller to be monitored establishing a point-to-point connection, through as many backbone networks as needed. The terminating WatchDog of the termination backbone network flows/transmits the request to a destination WatchDog associated with an IP Address Mapping Check Point of the target telephone number to be surveillanced. The destination watchdog communicates with the requesting watchdog using predefined protocols spanning the intervening backbone networks. The destination watchdog replicates the packets of the target telephone and transmits them to the originating monitor center.

In an aspect of the invention the target IP telephone being monitored is connected to the network through a hybrid fiber coax (HFC). HFC is a local connection medium in which a cable connection to the subscriber location is joined to a fiber connection to a backbone network.

In the instant embodiment flowing/transmitting is indicative of proper rate control and protocol control a well as connection. Hence the WatchDogs are a dynamic control element as well as a "direction of packets" routing interface element to/from and joining backbone networks. A backbone network may connect to a local device or network or to another backbone and is normally considered a long haul heavily trafficked network element.

BRIEF DESCRIPTION OF THE DRAWING

FIG. 2 is a flow process schematic of a method of monitoring an IP telephone separated from a monitoring intercept separated from the IP telephone by a plurality of backbone networks.

DETAILED DESCRIPTION

Figure 1:
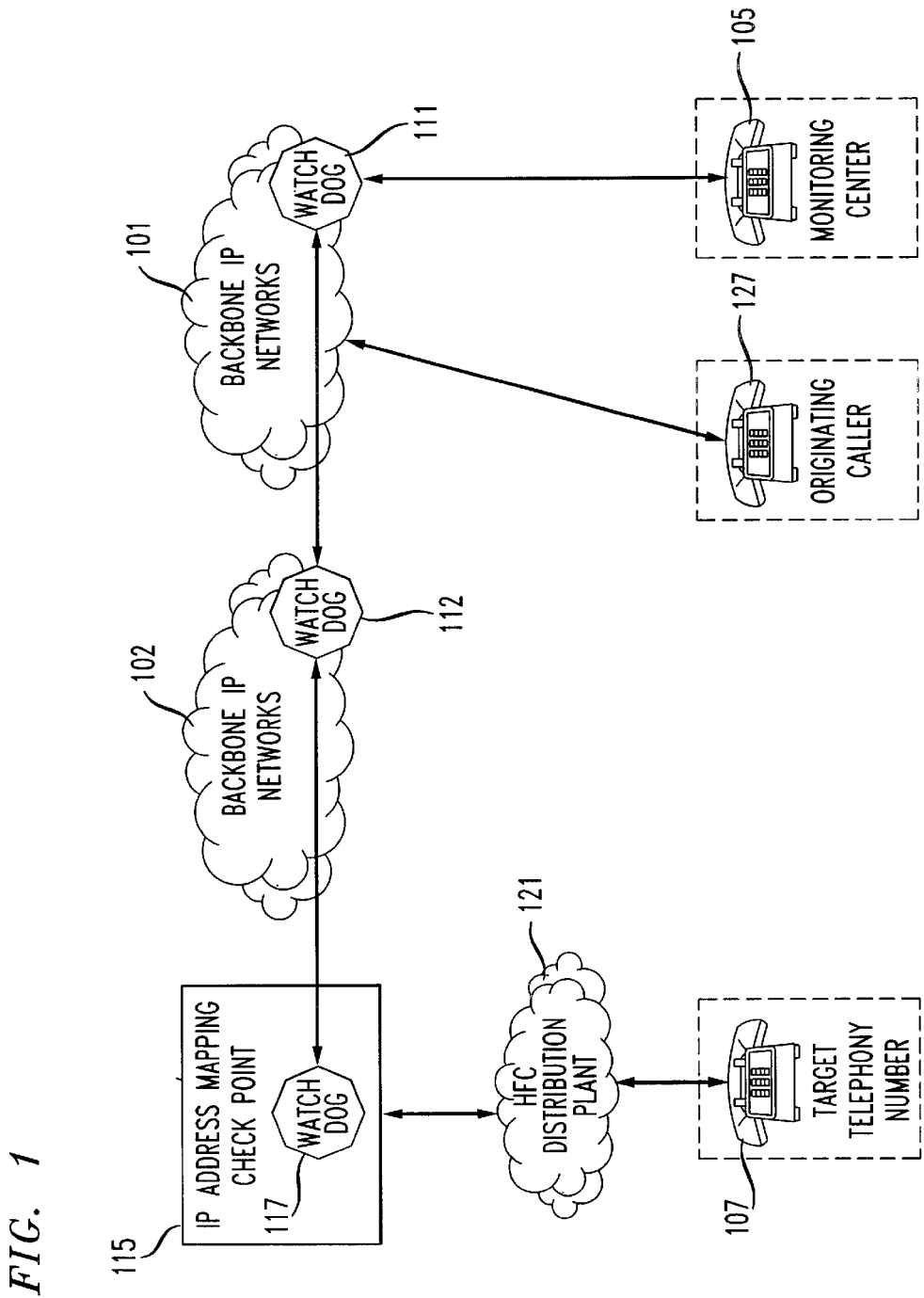
FIG. 1 is a block schematic of communication network including the plural backbone networks.

An illustrative monitoring network for monitoring IP phone calls of a target IP phone 107, which is connected to an IP network 101, of one technology is itself connected to an IP network 102 having a different technology. Each of the two backbone networks includes a WatchDog function 111 and 112 embodied in a program associated with the networks 101 and 102 respectively and which assist in detecting voice activity of one of designated telephone stations and assure proper packet format suitable to the network it is associated with.

As shown a Monitor center 105 is connected to the backbone network 101, which may be as shown an ATM network. The target IP telephone 107 is connected to a Hybrid Fiber Coaxial (HFC) Distribution Plant 109 to an IP Address Mapping Check Point (IP-AMCP) 115. The IP-AMCP may be embodied in a server within or connected to the network. It has the capability, through programming, of examining packet contents and authenticating users of the network. With specific WatchDog software the IP-AMCP identifies specific activity from designated telephone stations at a specified DN or IP address and can replicate/duplicate the packets of that phone which replicated/duplicated packets may be forwarded to a monitoring station.

The IP-AMCP 115 may alternatively comprise a programmed device with a WatchDog to duplicate voice packets of a monitored IP and identifies networks to be traversed between monitored device and its associated telephone in the conversation and the monitoring station. It automatically adapts/translates the voice packets to traverse such differing network types. The IP-AMCP 115 includes a WatchDog program 117 to activate the IP-AMCP when needed in response to voice activity of the target telephone 107.

The call is initiated by an originating caller at telephone station 127, and carried through the networks 101 (e.g., illustratively ATM) and 102 (e.g., illustratively IP) to the target telephone 107. Target telephone 107 is connected to network 102 vie a HFC Distribution plant 121 and the IP-AMCP 115 to the IP network 102. HFC is a local distribution network that couples the fiber of a network to the cable of the termination station via an electro-optical connection. This permits broadband service provision to the termination station.

Network 102 is connected by an IP link to the ATM network 101. A WatchDog function 112 is associated with network 102 and responds to traffic activity of the target telephone 107 via the IP-AMCP 115. Network 101 also includes a like purposed WatchDog function 111. The WatchDogs all process requests for surveillance of a target telephone and replicates the calls for monitoring purposes of the monitor center 105.

The surveillance method flow process is illustrated in the FIG. 2 flow chart. Initially after the start terminal 201 an agent connected to an originating backbone network requests surveillance as indicated in instruction block 203. In this arrangement the target IP telephone is connected to a different technology backbone network form that of the originating backbone network.

A WatchDog associated with the originating backbone network forwards the surveillance request, via WatchDogs of intervening backbone networks, to a WatchDog of the terminating backbone network using appropriate protocols as dictated by the intervening network as indicated in block 205.

The request is received at the terminating network as indicated in block 207 and in response the terminating WatchDog replicates the calls of the target IP telephone as per the instructions of block 209. The terminating WatchDog facilitates monitoring, by providing proper protocols in the transmission of these replicated calls, as per block 211, to the the originating WatchDog. These replicated calls are, as per block 213, forwarded to the originating monitoring station and the listening agent. The process is terminated at terminal point 215.

The following applications are being filed concurrently with the present application and are incorporated herein by reference. All applications have the same inventors (e.g., Kung, Russell, Sankalia and Wang):

1999-0185 Monitoring Selected IP Voice Calls Through Activity of a WatchDog Program at an IP-Addressing Mapping Check Point;

1999-0186 Monitoring IP voice calls under command of a PSTN Phone;

1999-0188 Multiple Routing and Automatic network Detection of a Monitored Call from an Intercepted Targeted IP Phone to Multiple Monitoring Locations;

1999-0189 Secure Detection of an Intercepted Targeted IP Phone from Multiple Monitoring Locations;

1999-0190 Automatic IP Directory Number Masking and Dynamic Packet Routing for IP Phone Surveillance;

1999-0229 IP Voice Call Surveillance through use of Non-dedicated IP Phone with Signal Alert Provided to Indicate Content of Incoming Call prior to an Answer as being a Monitored Call.

While exemplary systems and methods embodying the present inventions are shown by way of example, it will be understood, of course, that the invention is not limited to these embodiments. Modifications may be made by those skilled in the art which differ from the specific details disclosed here, but which are still within the scope of the invention. Further elements of one invention may be readily included as elements of one of the other inventions. Those skilled in the art may combine or distribute the elements in many different ways without departing from the spirit and scope of the invention.

What we claim is:

1. A method of observing a target IP telephony station from a monitoring station separated from each other but connected by a plurality of backbone networks, at least one of the backbone networks having a communication technology differing from a communication technology of another one of the plurality of backbone networks, comprising the steps of:

at the monitoring station, directing a command, for requesting an active surveillance of a target IP telephone, to a WatchDog functionary of a local backbone network to which the monitoring station is connected;

flowing/transmitting with appropriate backbone related protocols a surveillance request from an originating WatchDog associated with the one backbone network of the monitoring station to a terminating WatchDog associated with the another one of the backbone networks of the target IP telephony station;

replicating the voice packets at the target with the terminating WatchDog through a destination WatchDog covering the target IP telephony station; and communicating the replicated voice packets at the terminating WatchDog to the originating WatchDog using predefined protocols in transversing the network, and transmitting the replicated voice calls, from the originating WatchDog to the monitoring station.

2. The method of claim 1 wherein the step of;

the communicating includes establishing a point-to-point connection between originating Watchdog and the Terminating Watchdog.

3. The method of claim 1, wherein the method includes:

utilizing intervening WatchDogs for connections and protocol processing between the originating and terminating WatchDogs.

4. A surveillance and monitoring network for monitoring an IP telephone station connected to an IP backbone network and separated from the monitoring station by another type packet handling network, comprising:

an IP Address Mapping Check Point (IP-AMCP) connected to receive traffic packets and surveillance commands with respect to a particular target IP telephone to be monitored; and including an associated WatchDog function for replicating traffic of the target IP telephone;

a first WatchDog connected to the IP backbone network;

a second WatchDog connected the another type packet handling network and further connected to a monitoring station:

the first and second WatchDogs operative for providing protocol control across the IP backbone network and the another type of packet handling network; and the associated WatchDog function, the first WatchDog and the second WatchDog being connected to transmit the replicated traffic of the target IP telephone to the monitoring station.

5. The surveillance and monitoring network of claim 4, further comprising;

an originating caller device initiating calls to the target IP telephone;

being connected to the another type of packet handling network.

* * * * *